United States Patent
Bettencourt et al.

(10) Patent No.: US 9,168,618 B1
(45) Date of Patent: Oct. 27, 2015

(54) MANUFACTURING ASSEMBLY AND METHOD OF LOCATING A FACE INSERT IN A GOLF CLUB HEAD

(71) Applicant: CALLAWAY GOLF COMPANY, Carlsbad, CA (US)

(72) Inventors: Alan C. Bettencourt, Solana Beach, CA (US); Robert Maple, Chula Vista, CA (US)

(73) Assignee: CALLAWAY GOLF COMPANY, Carlsbad, CA (US)

( * ) Notice: Subject to any disclaimer, the term of this patent is extended or adjusted under 35 U.S.C. 154(b) by 290 days.

(21) Appl. No.: 13/767,147

(22) Filed: Feb. 14, 2013

Related U.S. Application Data

(60) Provisional application No. 61/748,404, filed on Jan. 2, 2013.

(51) Int. Cl.
| | |
|---|---|
| B23P 19/00 | (2006.01) |
| B23P 15/00 | (2006.01) |
| B23P 19/04 | (2006.01) |
| B23P 19/10 | (2006.01) |
| A63B 53/04 | (2015.01) |

(52) U.S. Cl.
CPC ............... *B23P 19/007* (2013.01); *A63B 53/04* (2013.01); *B23P 15/00* (2013.01); *B23P 19/04* (2013.01); *B23P 19/10* (2013.01)

(58) Field of Classification Search
CPC .......... B23P 15/00; B23P 19/00; B23P 19/04; B23P 19/10; B23P 19/12; B25B 11/005; B25J 15/009; B25J 15/0616; B65B 35/18; B65G 47/91; Y10T 29/49893; Y10T 29/49895; Y10T 29/49899; Y10T 29/49902; Y10T 29/49998; Y10T 29/53191; Y10T 29/53978; Y10T 29/53991
See application file for complete search history.

(56) References Cited

U.S. PATENT DOCUMENTS

| | | | | |
|---|---|---|---|---|
| 4,589,184 | A * | 5/1986 | Asano et al. | 29/430 |
| 4,640,501 | A * | 2/1987 | Poland | 269/21 |
| 4,747,589 | A * | 5/1988 | Watson et al. | 269/21 |
| 5,181,307 | A * | 1/1993 | Kitahama et al. | 29/434 |
| 5,283,937 | A * | 2/1994 | Uesugi | 29/281.5 |
| 5,778,517 | A * | 7/1998 | Amesbichler et al. | 29/709 |
| 6,481,078 | B1 * | 11/2002 | Stone | 29/281.5 |
| 6,672,576 | B1 * | 1/2004 | Walker | 269/21 |
| 6,708,393 | B1 * | 3/2004 | Roy et al. | 29/714 |
| 2005/0008469 | A1 * | 1/2005 | Jung | 414/729 |
| 2005/0177991 | A1 * | 8/2005 | Cole et al. | 29/467 |
| 2007/0105657 | A1 * | 5/2007 | Hirano | 473/345 |
| 2010/0024190 | A1 * | 2/2010 | Vontz et al. | 29/428 |
| 2011/0023286 | A1 * | 2/2011 | Bierman | 29/466 |
| 2012/0102711 | A1 * | 5/2012 | Ali | 29/429 |

* cited by examiner

*Primary Examiner* — Christopher M Koehler
(74) *Attorney, Agent, or Firm* — Rebecca Hanovice; Michael A. Catania; Sonia Lari

(57) ABSTRACT

A manufacturing assembly and a method for locating a face insert in a golf club head during manufacture are disclosed herein. In particular, the manufacturing assembly comprises a face locating fixture sized to receive a golf club face insert and a pick fixture configured to removably attach to the face insert. The manufacturing assembly may further comprise a holding fixture sized to receive a golf club head and hold it in place while the face insert is aligned with the head during assembly.

12 Claims, 4 Drawing Sheets

MANUFACTURING ASSEMBLY AND METHOD OF LOCATING A FACE INSERT IN A GOLF CLUB HEAD

CROSS REFERENCES TO RELATED APPLICATIONS

The present application claims priority to U.S. Provisional Patent Application No. 61/748,404, filed on Jan. 2, 2013, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

1. Field of the Invention

The present invention relates to a manufacturing assembly and method for locating a face insert in a golf club head during manufacture. More specifically, the present invention relates to a manufacturing assembly that accurately centers a face insert in a front opening of a golf club head so that it can be welded in place.

2. Description of the Related Art

Many golf club manufacturers build their golf clubs by forming a hollow golf club body having an opening in the face and welding, soldering, brazing, or otherwise permanently or semi permanently affixing a separate face insert into the opening in the face. There is a need to efficiently and accurately perform this step during manufacturing in a way that also permits mass production of the golf club heads.

BRIEF SUMMARY OF THE INVENTION

The present invention is a novel way of assembling a golf club head having a face opening with a face insert, and allows golf club manufacturers to mass produce heads using the fixtures described herein.

One aspect of the present invention is a manufacturing assembly comprising a face locating fixture, and a pick fixture, wherein the face locating fixture is sized to receive a golf club face insert, and wherein the pick fixture is configured to removably attach to the face insert. In some embodiments, the pick fixture may comprise at least one engagement mechanism, which may be at least one suction cup, or a plurality of suction cups. In some embodiments, the pick fixture may comprise a plurality of alignment prongs, such as at least three alignment prongs. In a further embodiment, the pick fixture may further comprise at least one engagement mechanism, and the plurality of alignment prongs may at least partially encircle the at least one engagement mechanism.

In yet a further embodiment, the pick fixture may comprise a base plate comprising a first extension, a second extension, and a third extension, a first alignment prong, a second alignment prong, a third alignment prong, a fourth alignment prong, a fifth alignment prong, and a sixth alignment prong, wherein the first alignment prong and the second alignment prong may extend perpendicularly from the first extension, wherein the third alignment prong and the fourth alignment prong may extend perpendicularly from the second extension, and wherein the fifth alignment prong and the sixth alignment prong may extend perpendicularly from the third extension. In some further embodiments, the face locating fixture may comprise a depression sized to receive the face insert, a first locating hole sized to receive the first alignment prong, a second locating hole sized to receive the third alignment prong, and a third locating hole sized to receive the fifth alignment prong.

In another embodiment, wherein the at least one engagement mechanism may be powered by a system selected from the group consisting of a pneumatic system and a hydraulic system. In other embodiments, the manufacturing assembly may further comprise a holding fixture sized to receive a golf club head. In some further embodiments, the holding fixture may comprise a frame and a plurality of clamping features, and the plurality of clamping features may be configured to securely retain a golf club head within the frame. In yet a further embodiment, the plurality of clamping features may be a plurality of screws. In other embodiments, the face locating fixture may be composed of a metal material.

Another aspect of the present invention is a method of assembling a golf club head, the method comprising securing a golf club head in a holding fixture, wherein the golf club head comprises an opening in a front wall, locating a golf club face insert in a face locating fixture, lifting the golf club face insert from the face locating fixture with a pick fixture, disposing the face insert within the opening, and welding the face insert to the golf club head. In a further embodiment, the holding fixture may comprise a frame and a plurality of clamping features, and the plurality of clamping features may be configured to securely retain a golf club head within the frame. In an alternative embodiment, the step of welding the face insert within the opening may comprise tack welding the face insert to the golf club head. In yet another alternative embodiment, the step of disposing the face insert within the opening may be performed using the pick fixture. In another embodiment, the pick fixture may comprise at least one engagement mechanism, which may be at least one suction cup.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

A preferred embodiment of the present invention is shown in FIGS. 1-6. The manufacturing assembly of the present invention includes a face locating fixture 10, shown in FIGS. 1, 3, and 4, which includes a depression 12 sized to receive a face insert 20 and three locating bores 14, 16, 18 proximate to and encircling the depression 12. The face locating fixture 10 preferably is rectangular and is formed from an inelastic material such as metal, but may in alternative embodiments be composed of plastic and/or composite materials, and may have any shape that contributes to efficient mass production.

Figure 4:
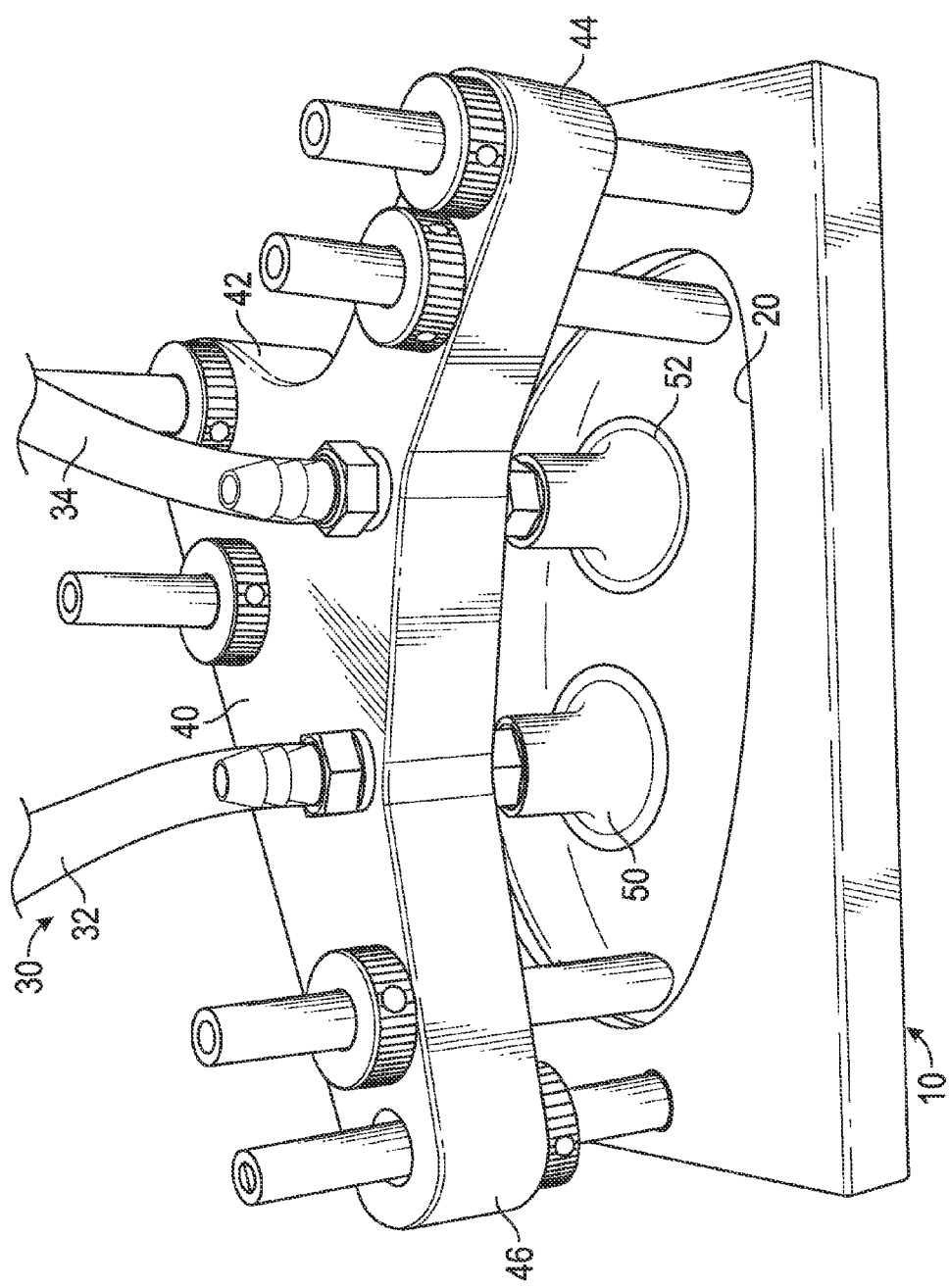
FIG. 4 is a top perspective view of a pick fixture engaged with the assembly shown in FIG. 3.
Figure 5:
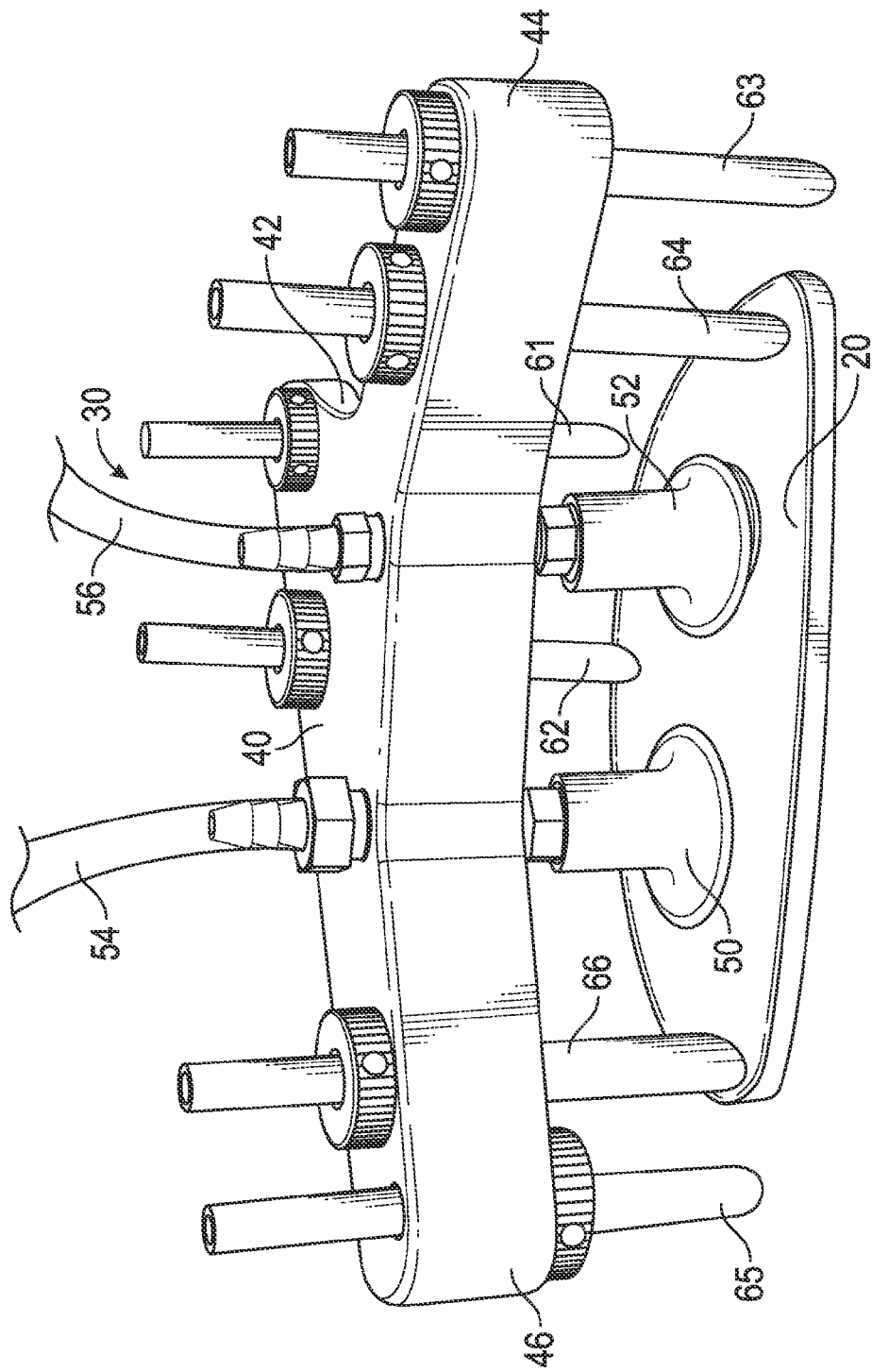
FIG. 5 is a top perspective view of the pick fixture shown in FIG. 4 engaged with the face insert shown in FIG. 2.
Figure 6:
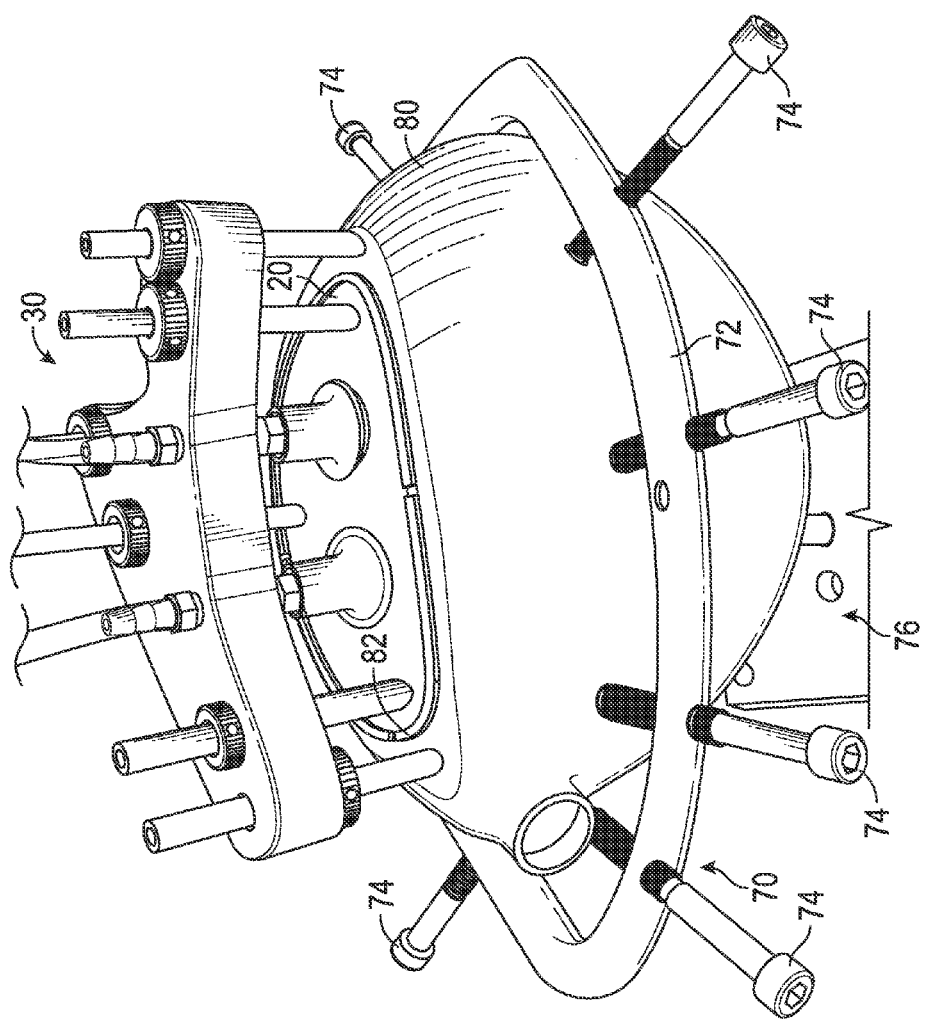
FIG. 6 is a top perspective view of the assembly shown in FIG. 5 engaged with an exemplary golf club head body.

The manufacturing assembly further includes a pick fixture 30, shown in FIGS. 4-6 which in the preferred embodiment comprises a central region 40 and three extension regions 42, 44, 46 radiating horizontally from the central region 40. The pick fixture 30 preferably is powered by a pneumatic system, comprising at least two air feed tubes 32, 34 and at least two suction cups 50, 52 sized to releasably grip the face insert 20, but in alternative embodiments may comprise any type of engagement feature or system known to a person of skill in the art to securely, but removably, affix to a face insert 20. As shown in FIG. 5, the pick fixture 30 also includes six alignment prongs 61, 62, 63, 64, 65, 66 extending perpendicularly from the extension regions 42, 44, 46 and generally encircling the suction cups 50, 52. In particular, each extension region 42, 44, 46 includes two alignment prongs 61, 62, 63, 64, 65, 66, one of which rests against the face insert 20 and the other which fits within the locating bores 14, 16, 18 of the face locating fixture 10. As shown in FIG. 4, the alignment prongs 61, 63, 65 that engage with the locating bores 14, 16, 18 ensure that the pick fixture 30 is properly centered on the face insert 20 when the face insert 20 is disposed within the face locating fixture 10, while the alignment prongs 62, 64, 66 that rest against the face insert 20 ensure that the face insert 20 is properly spaced from the central region 40 of the pick fixture 30.

The manufacturing assembly also includes a holding fixture 70 sized to receive a golf club head 80, which in FIG. 6 is a driver-type golf club head but may, in alternative embodiments, be any type of golf club head known to a person skilled in the art. The holding fixture 70 preferably includes a frame 72, a plurality of clamping features 74, which in the preferred embodiment are screws that are threaded through the frame 72 to engage with the golf club head 80, and a base 76 from which the frame extends. In alternative embodiments, the holding fixture 70 may have any type of clamping or holding features known to a person skilled in the art that will fix the golf club head 80 in place during assembly.

Figure 1:
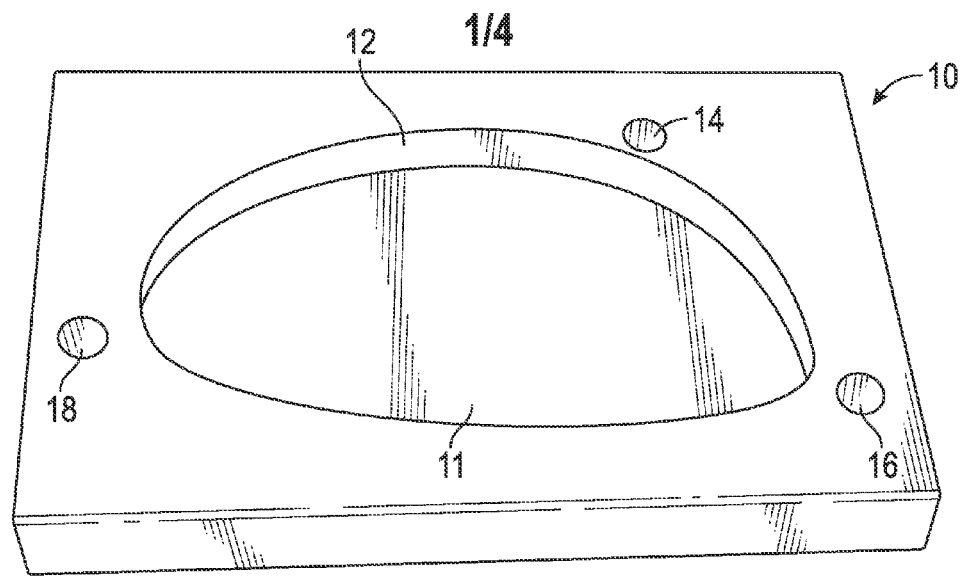
FIG. 1 is a top perspective view of the face locating fixture of the present invention.
Figure 2:
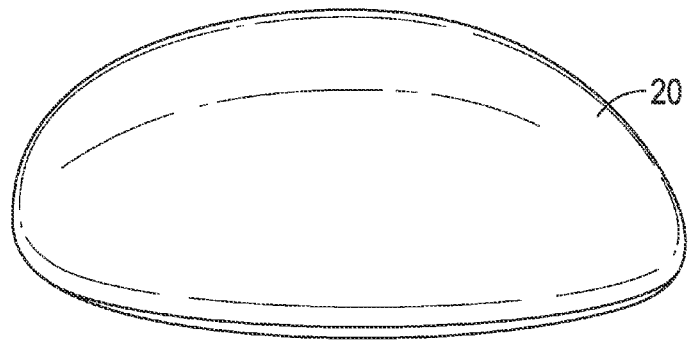
FIG. 2 is a top perspective view of an exemplary face insert for use with the present invention.
Figure 3:
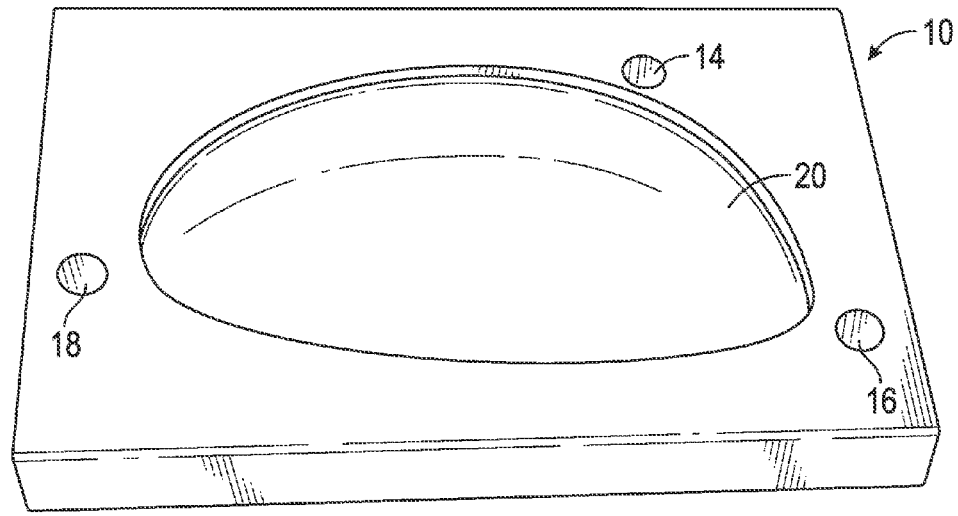
FIG. 3 is a top perspective view of the face insert shown in FIG. 2 engaged with the face locating fixture of FIG. 1.

A face insert 20 may be assembled with a golf club head 80 using the manufacturing assembly disclosed herein via the following steps. First, a face insert 20 is placed within the depression 12 of a face locating fixture 10 such that it rests against a bottom surface 11 of the depression 12, as shown in FIG. 3. The pick fixture 30 is then engaged with the face locating fixture 10 such that three of the alignment prongs 62, 64, 66 rest against the face insert 20 and the remaining alignment prongs 61, 63, 65 fit within the locating bores 14, 16, 18 of the face locating fixture 10. The suction cups 50, 52 of the face locating fixture are then activated by adjusting the air pressure within the feed tubes 32, 34, so that the suction cups 50, 52 are releasably affixed to the face insert 20. The pick fixture 30 is then moved so that the face insert 20 is removed from the face locating fixture 10, as shown in FIG. 5, and placed within an opening 82 in the golf club head 80 as shown in FIG. 6. In this configuration, the alignment prongs 61, 63, 65 rest against the golf club head 80, which can prevent movement of the face insert 20 during assembly. The face insert 20 is then tack welded (or semi-permanently affixed via other means) to the golf club head 80 around the opening 82, and the suction cups 50, 52 are released from the face insert 20 so that the pick fixture can be used to assemble another face insert with another golf club head. The golf club head 80 can then be moved to another workstation so the face insert 20 can be welded, soldered, brazed, or otherwise permanently affixed to the golf club head 80.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club manufacturing assembly comprising:
a golf club face insert;
a face locating fixture comprising a depression sized to receive the face insert;
a pick fixture comprising at least one engagement mechanism and a plurality of alignment prongs; and
a golf club head comprising a front opening,
wherein the front opening is sized to receive the face insert,
wherein the at least one engagement mechanism is configured to removably attach to the face insert, and
wherein the pick fixture is configured to move the face insert from the face locating fixture to the golf club head.

2. The manufacturing assembly of claim 1, wherein the at least one engagement mechanism is at least one suction cup.

3. The manufacturing assembly of claim 2, wherein the at least one suction cup comprises a plurality of suction cups.

4. The manufacturing assembly of claim 1, wherein the pick fixture comprises at least three alignment prongs.

5. The manufacturing assembly of claim 1, wherein the plurality of alignment prongs at least partially encircles the at least one engagement mechanism.

6. The manufacturing assembly of claim 4,
wherein the pick fixture comprises a base plate comprising a first extension, a second extension, and a third extension,
wherein the pick fixture comprises a first alignment prong, a second alignment prong, a third alignment prong, a fourth alignment prong, a fifth alignment prong, and a sixth alignment prong,
wherein the first alignment prong and the second alignment prong extend perpendicularly from the first extension,
wherein the third alignment prong and the fourth alignment prong extend perpendicularly from the second extension, and
wherein the fifth alignment prong and the sixth alignment prong extend perpendicularly from the third extension.

7. The manufacturing assembly of claim 6, wherein the face locating fixture comprises a first locating hole sized to receive the first alignment prong, a second locating hole sized to receive the third alignment prong, and a third locating hole sized to receive the fifth alignment prong, and wherein the locating holes encircle the depression.

8. The manufacturing assembly of claim 1, wherein the at least one engagement mechanism is powered by a system selected from the group consisting of a pneumatic system and a hydraulic system.

9. The manufacturing assembly of claim 1, wherein the manufacturing assembly further comprises a holding fixture sized to receive a golf club head.

10. The manufacturing assembly of claim 9, wherein the holding fixture comprises a frame and a plurality of clamping features, and wherein the plurality of clamping features are configured to securely retain a golf club head within the frame.

11. The manufacturing assembly of claim 10, wherein the plurality of clamping features is a plurality of screws.

12. The manufacturing assembly of claim 1, wherein the face locating fixture is composed of a metal material.

* * * * *